(12) United States Patent
Tanaka (10) Patent No.: US 12,247,844 B2
(45) Date of Patent: Mar. 11, 2025

(54) APPARATUS, METHOD, AND COMPUTER PROGRAM FOR DETERMINING SECTIONS FOR MAP UPDATE

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 18/155,874

(22) Filed: Jan. 18, 2023

(65) Prior Publication Data

US 2023/0296407 A1     Sep. 21, 2023

(30) Foreign Application Priority Data

Mar. 16, 2022   (JP) .................................. 2022-041856

(51) Int. Cl.
    *G01C 21/00*        (2006.01)
    *B60W 60/00*        (2020.01)

(52) U.S. Cl.
    CPC ..... *G01C 21/3889* (2020.08); *B60W 60/0053* (2020.02); *G01C 21/3815* (2020.08); *G01C 21/3896* (2020.08); *B60W 2556/40* (2020.02)

(58) Field of Classification Search
    CPC ............ G01C 21/3889; G01C 21/3815; G01C 21/3896; B60W 60/0053; B60W 2556/40
    USPC .......................................................... 701/45
    See application file for complete search history.

(56) References Cited

U.S. PATENT DOCUMENTS

| | | | |
|---|---|---|---|
| 11,099,561 B1* | 8/2021 | Kentley-Klay | G05D 1/0061 |
| 2015/0134176 A1* | 5/2015 | Ham | B60W 50/082 |
| | | | 701/23 |
| 2017/0176991 A1* | 6/2017 | Hoskeri | G01S 19/01 |
| 2019/0171218 A1* | 6/2019 | Hammond | G05D 1/0223 |
| 2020/0133303 A1 | 4/2020 | Sakaguchi | |
| 2020/0182628 A1* | 6/2020 | Bjernetun | G01C 21/3691 |
| 2020/0249670 A1 | 8/2020 | Takemura et al. | |

FOREIGN PATENT DOCUMENTS

| | | |
|---|---|---|
| JP | 2020-071053 A | 5/2020 |
| WO | 2018/180097 A1 | 10/2018 |

* cited by examiner

*Primary Examiner* — Krishnan Ramesh
(74) *Attorney, Agent, or Firm* — Sughrue Mion, PLLC (57) ABSTRACT

An apparatus for determining sections for map update includes a processor configured to calculate a score indicating the degree of improvement of drivers' convenience provided by generating or updating map information regarding two or more road sections selected from road sections where the map information is unavailable, based on handover costs between autonomous driving and manual driving, calculate the score while replacing one or more of the two or more selected road sections with one or more unselected road sections, and identify the two or more selected road sections corresponding to a score for the case where the degree of improvement of drivers' convenience is the highest among the scores calculated before the score satisfies a predetermined end condition, as target road sections for generating or updating the map information.

11 Claims, 7 Drawing Sheets

APPARATUS, METHOD, AND COMPUTER PROGRAM FOR DETERMINING SECTIONS FOR MAP UPDATE

FIELD

The present invention relates to an apparatus, a method, and a computer program for determining target road sections for generating or updating map information.

BACKGROUND

High-precision maps to which an autonomous vehicle driving system refers for autonomous driving control of a vehicle are required to accurately represent information on those features on or around roads which relate to travel of vehicles. Thus, techniques to collect data including information on features from vehicles actually traveling on roads have been proposed (see International Publication WO2018/180097A and Japanese Unexamined Patent Publication JP2020-71053A).

A server device disclosed in WO2018/180097A transmits a request for state information, which indicates the state of a location to which a first moving object capable of autonomous driving has moved, to a second moving object capable of transmitting the state information. The server device stops transmitting the request for state information when situation information on autonomous driving received from the first moving object indicates that autonomous driving is possible.

In a map information system disclosed in JP2020-71053A, an in-vehicle device determines whether takeover or transition from autonomous driving control to manual driving has occurred during autonomous driving control. When takeover occurs, the in-vehicle device sets an upload target area including the position of occurrence of the takeover. The in-vehicle device then reads out map information on the upload target area from storage, and uploads the read-out map information to an external device. The external device updates external map information, based on the map information uploaded from the in-vehicle device.

SUMMARY

To collect data including information on features at a certain location, a vehicle actually travels through the location to generate data including information on features at the location, and transmits the generated data to a device that generates or updates map information, as in the above-described techniques. Thus, various costs including a communication cost are incurred to collect data including information on features and to generate or update map information on the basis of the collected data. However, there is a limit to man-hours or budget available for generating or update map information. Thus, it is desirable to determine target road sections for generating or updating map information, i.e., target road sections for collecting data including information on features so that vehicle drivers can have the greatest advantage of autonomous driving control within limited man-hours or budget.

It is an object of the present invention to provide an apparatus that determines target road sections for generating or updating map information so that drivers are likely to have the advantage of autonomous driving control.

According to an embodiment, an apparatus for determining sections for map update is provided. The apparatus includes a memory configured to store, for each of a plurality of road sections included in a predetermined region, a map preparation cost required to generate or update map information for a vehicle to travel by autonomous driving regarding the road section, a map flag indicating whether the map information is available, and a handover cost indicating a driver's load for the case where a handover between autonomous driving and manual driving occurs between the road section and an adjacent road section, of the plurality of road sections, adjoining the road section; and a processor configured to: select two or more road sections from road sections where the map information is unavailable among the plurality of road sections so that the total of the map preparation costs of the selected road sections is not greater than a target upper-limit preparation cost, by referring to the map flags of the plurality of road sections, calculate a score indicating the degree of improvement of drivers' convenience provided by generating or updating the map information regarding the two or more selected road sections, based on the handover costs of the two or more selected road sections, calculate the score while replacing one or more of the two or more selected road sections with one or more unselected road sections of the road sections where the map information is unavailable, determine whether the score satisfies a predetermined end condition, and identify, when the predetermined end condition is satisfied, the two or more selected road sections corresponding to a score for the case where the degree of improvement of drivers' convenience is the highest among the calculated scores as target road sections for generating or updating the map information.

For each of the plurality of road sections, the memory of the apparatus preferably further stores a traffic volume of the road section and an autonomous driving cost indicating a driver's load for the case where a vehicle travels through the road section by autonomous driving using the map information. The processor preferably weights, for each of the two or more selected road sections, the sum of the autonomous driving cost and the handover cost of the road section with a weighting factor depending on the traffic volume of the road section, and calculates the total of the weighted sums as the score.

Alternatively, for each of the plurality of road sections, the memory of the apparatus preferably further stores a traffic volume of the road section, an autonomous driving cost indicating a driver's load for the case where a vehicle travels through the road section by autonomous driving using the map information, and a manual driving cost indicating a driver's load for the case where a vehicle travels through the road section by the driver's manual driving. The processor preferably weights, for each of the two or more selected road sections, the value of the autonomous driving cost minus the manual driving cost plus the handover cost with a weighting factor depending on the traffic volume of the road section, and calculates the total of the weighted values as the score.

The processor of the apparatus preferably replaces a road section of the two or more selected road sections with the unselected road section so that, of the two or more selected road sections, a road section having a greater product of the map preparation cost and an individual-section score calculated for the road section is more likely to be replaced with the unselected road section. The individual-section score is a part of the score.

For each of the plurality of road sections, the memory of the apparatus preferably further stores a traffic volume of the road section. The processor preferably selects two or more road sections from road sections where the map information is unavailable among the plurality of road sections in descending order of the ratio of the traffic volume to the map preparation cost.

According to another embodiment, a method for determining sections for map update is provided. The method includes selecting, among a plurality of road sections included in a predetermined region, two or more road sections from road sections where map information for a vehicle to travel by autonomous driving is unavailable so that the total of map preparation costs required to generate or update the map information regarding the selected road sections is not greater than a target upper-limit preparation cost, by referring to map flags respectively indicating whether the map information is available regarding the plurality of road sections; and calculating a score indicating the degree of improvement of drivers' convenience provided by generating or updating the map information regarding the two or more selected road sections, based on handover costs of the two or more selected road sections. The handover costs each indicates a driver's load for the case where a handover between autonomous driving and manual driving occurs between the corresponding road section and an adjacent road section, of the plurality of road sections, adjoining the road section. The method further includes calculating the score while replacing one or more of the two or more selected road sections with one or more unselected road sections of the road sections where the map information is unavailable; determining whether the score satisfies a predetermined end condition; and identifying, when the predetermined end condition is satisfied, the two or more selected road sections corresponding to a score for the case where the degree of improvement of drivers' convenience is the highest among the calculated scores as target road sections for generating or updating the map information.

According to still another embodiment, a non-transitory recording medium that stores a computer program for determining sections for map update is provided. The computer program includes instructions causing a computer to execute a process including selecting, among a plurality of road sections included in a predetermined region, two or more road sections from road sections where map information for a vehicle to travel by autonomous driving is unavailable so that the total of map preparation costs required to generate or update the map information regarding the selected road sections is not greater than a target upper-limit preparation cost, by referring to map flags respectively indicating whether the map information is available regarding the plurality of road sections; and calculating a score indicating the degree of improvement of drivers' convenience provided by generating or updating the map information regarding the two or more selected road sections, based on handover costs of the two or more selected road sections. The handover costs each indicate a driver's load for the case where a handover between autonomous driving and manual driving occurs between the corresponding road section and an adjacent road section, of the plurality of road sections, adjoining the road section. The process further includes calculating the score while replacing one or more of the two or more selected road sections with one or more unselected road sections of the road sections where the map information is unavailable; determining whether the score satisfies a predetermined end condition; and identifying, when the predetermined end condition is satisfied, the two or more selected road sections corresponding to a score for the case where the degree of improvement of drivers' convenience is the highest among the calculated scores as target road sections for generating or updating the map information.

The apparatus according to the present disclosure has an advantageous effect of being able to determine target road sections for generating or updating map information so that drivers are likely to have the advantage of autonomous driving control.

DESCRIPTION OF EMBODIMENTS

An apparatus for determining sections for map update, a method therefor executed by the apparatus, and a computer program therefor will now be described with reference to the attached drawings. The apparatus determines target road sections for generating or updating map information used in autonomous driving control from among a plurality of road sections included in a target region for generating or updating the map information so that many drivers can have the advantage of autonomous driving control. To this end, the apparatus selects two or more road sections so that the total of costs required to prepare a map of selected road sections among the plurality of road sections is not greater than a target upper-limit preparation cost. While replacing a road section of the two or more selected road sections with an unselected road section, the apparatus calculates a score indicating the degree of improvement of drivers' convenience provided by generating or updating the map information regarding the selected road sections. When a calculated score satisfies a predetermined end criterion, the apparatus determines the road sections corresponding to a score for the case where the degree of improvement of convenience is the highest among the already calculated scores as target road sections for generating or updating the map information. Regarding the determined road sections, the apparatus then notifies an instruction to collect data representing features related to travel of vehicles (hereafter "feature data") to a vehicle capable of generating feature data.

Figure 1:
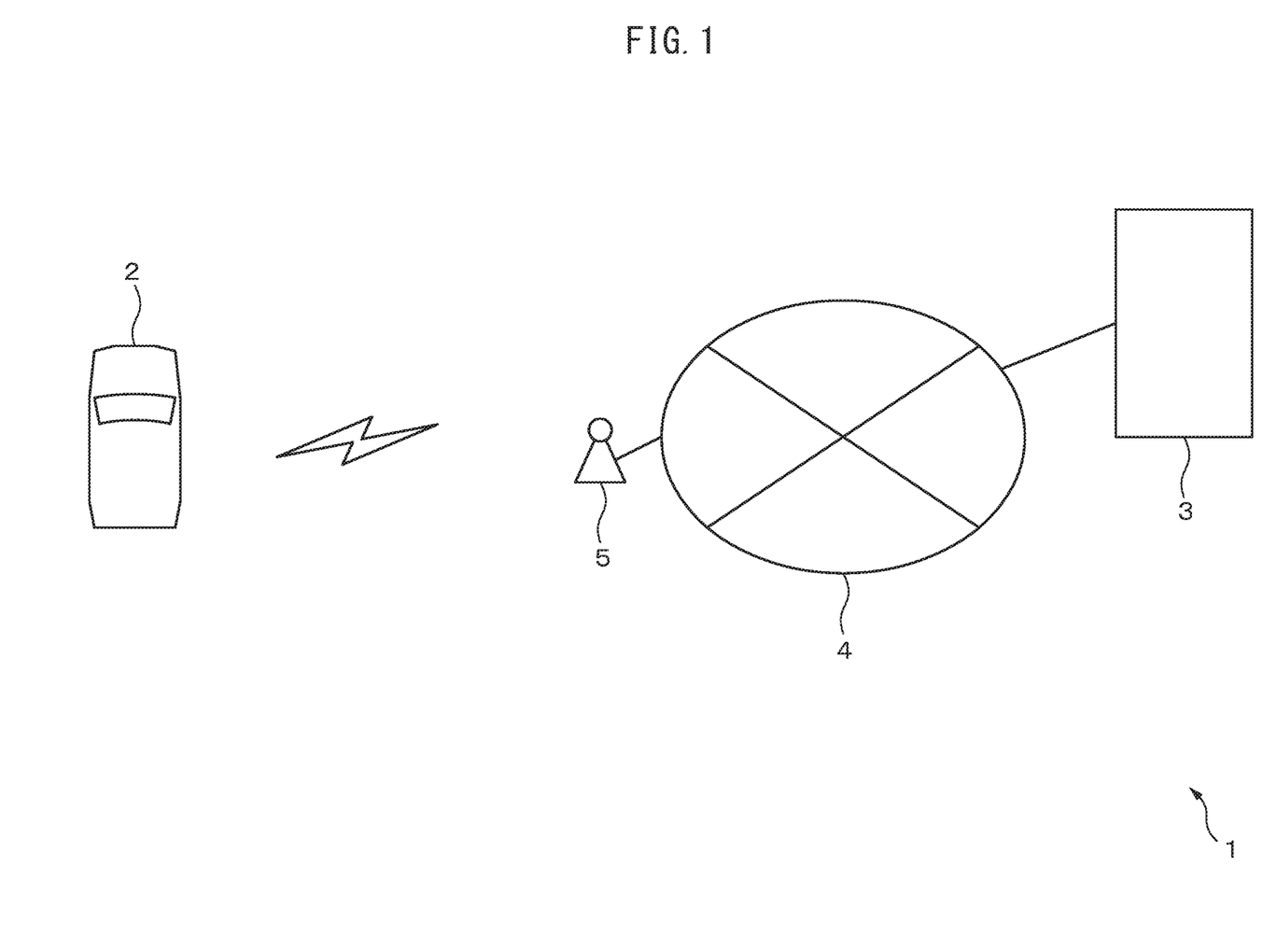
FIG. 1 schematically illustrates the configuration of a map update system equipped with an apparatus for determining sections for map update.

FIG. 1 schematically illustrates the configuration of a map update system equipped with the apparatus for determining sections for map update. In the present embodiment, the map update system 1 includes at least one vehicle 2 and a server 3, which is an example of the apparatus for determining sections for map update. The vehicle 2 accesses a wireless base station 5, which is connected, for example, via a gateway (not illustrated) to a communication network 4 connected with the server 3, thereby connecting to the server 3 via the wireless base station 5 and the communication network 4. FIG. 1 illustrates only a single vehicle 2, but the map update system 1 may include multiple vehicles 2. The communication network 4 may be connected with multiple wireless base stations 5. The server 3 may be communicably connected via the communication network 4 to a traffic information server (not illustrated) that manages traffic information.

Figure 2:
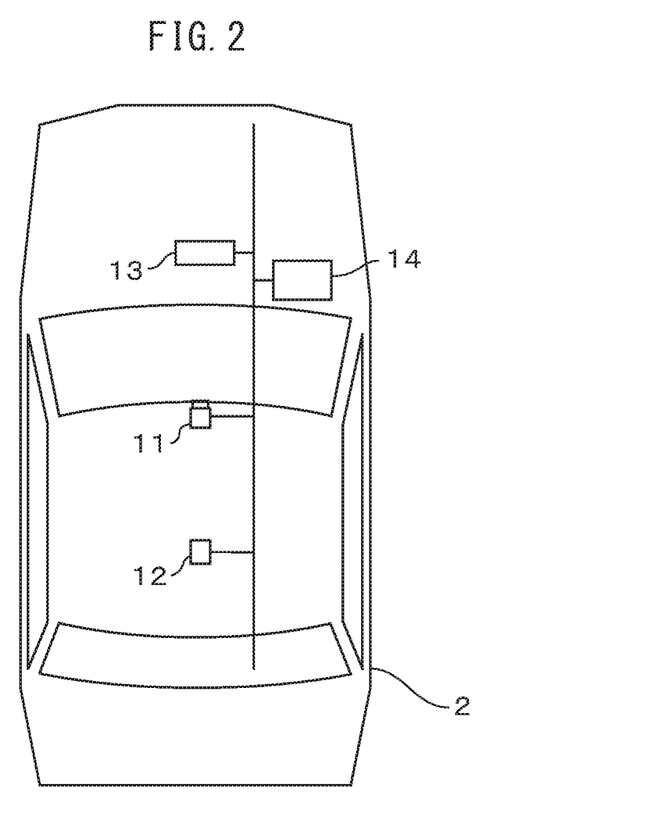
FIG. 2 schematically illustrates the configuration of a vehicle included in the map update system.

FIG. 2 schematically illustrates the configuration of the vehicle 2. The vehicle 2 includes a camera 11, a GPS receiver 12, a wireless communication terminal 13, and a data acquisition device 14, which are communicably connected via an in-vehicle network conforming to a standard such as a controller area network.

The camera 11, which is an example of an image capturing unit for capturing the surroundings of the vehicle 2, includes a two-dimensional detector constructed from an array of optoelectronic transducers, such as CCD or C-MOS, having sensitivity to visible light and a focusing optical system that forms an image of a target region of capturing on the two-dimensional detector. The camera 11 is mounted, for example, in the interior of the vehicle 2 so as to be oriented, for example, to the front of the vehicle 2. The camera 11 captures a region in front of the vehicle 2 every predetermined capturing period (e.g., $1/30$ to $1/10$ seconds), and generates images representing this region. The images obtained by the camera 11 may be color or grayscale images. The vehicle 2 may include multiple cameras 11 taking pictures in different orientations or having different focal lengths.

Whenever an image is generated, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. The vehicle 2 may include a receiver conforming to a satellite positioning system other than the GPS receiver 12. In this case, the receiver determines the position of the vehicle 2.

The wireless communication terminal 13 is a device to execute a wireless communication process conforming to a predetermined standard of wireless communication, and accesses, for example, the wireless base station 5 to connect to the server 3 via the wireless base station 5 and the communication network 4. The wireless communication terminal 13 receives a downlink radio signal from the wireless base station 5, and passes an instruction to collect feature data from the server 3 included in the radio signal to the data acquisition device 14. In addition, the wireless communication terminal 13 generates an uplink radio signal including feature data received from the data acquisition device 14, and transmits the uplink radio signal to the wireless base station 5 to transmit the feature data to the server 3.

Figure 3:
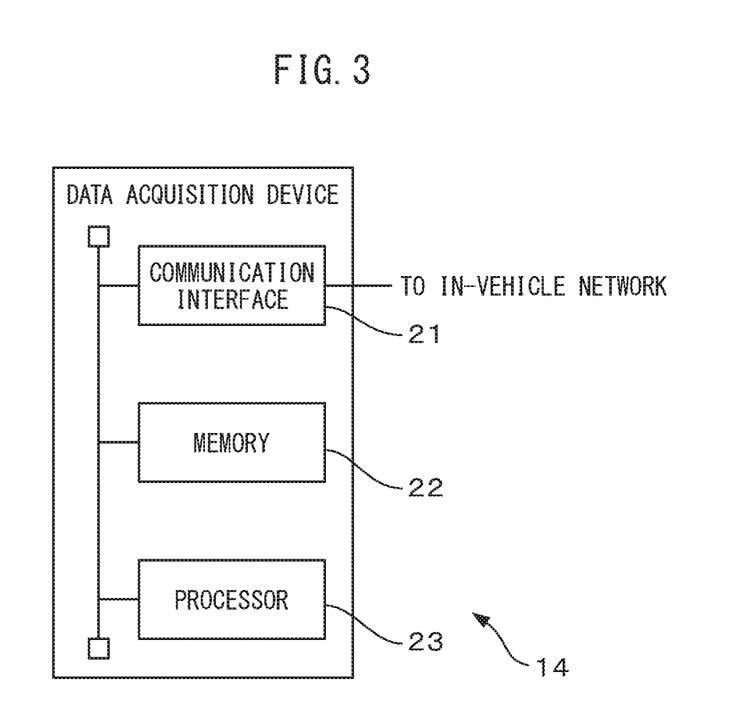
FIG. 3 illustrates the hardware configuration of a data acquisition device mounted on the vehicle.

FIG. 3 illustrates the hardware configuration of the data acquisition device. The data acquisition device 14 executes processing related to generation of feature data, based on an image generated by the camera 11. To achieve this, the data acquisition device 14 includes a communication interface 21, a memory 22, and a processor 23.

The communication interface 21 includes an interface circuit for connecting the data acquisition device 14 to the in-vehicle network. In other words, the communication interface 21 is connected to the camera 11, the GPS receiver 12, and the wireless communication terminal 13 via the in-vehicle network. Whenever an image is received from the camera 11, the communication interface 21 passes the received image to the processor 23. Whenever positioning information is received from the GPS receiver 12, the communication interface 21 passes the received positioning information to the processor 23. Further, the communication interface 21 outputs feature data received from the processor 23 to the wireless communication terminal 13 via the in-vehicle network. Further, the communication interface 21 passes to the processor 23 an instruction to collect feature data received from the server 3 via the wireless communication terminal 13.

The memory 22 includes, for example, volatile and nonvolatile semiconductor memories. The memory 22 may further include other storage, such as a hard disk drive. The memory 22 stores various types of data used in processing related to generation of feature data executed by the processor 23 of the data acquisition device 14. Such data includes, for example, a road map; identifying information of the vehicle 2; parameters of the camera 11, such as the height of the mounted position, the direction of image capturing, and the angle of view of the camera 11; and a set of parameters for defining a classifier for detecting a feature from an image. The road map may be, for example, a map used by a navigation device, and includes information on the positions and the lengths of road sections included in a region represented in the road map as well as information on the connection relationship between road sections at individual intersections in the region. The memory 22 may also store images received from the camera 11 and positioning information received from the GPS receiver 12 for a certain period. In addition, the memory 22 stores information indicating a target road section for generating and collecting feature data (hereafter a "collection target section") specified in an instruction to collect feature data. The memory 22 may further store computer programs for various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11 and positioning information received from the GPS receiver 12 in the memory 22. In addition, the processor 23 executes processing related to generation of feature data at predetermined intervals (e.g., 0.1 to 10 seconds) during travel of the vehicle 2.

As the processing related to generation of feature data, for example, the processor 23 determines whether the position of the vehicle 2 indicated by positioning information received from the GPS receiver 12 is within a collection target section. When the position of the vehicle is within a collection target section, the processor 23 generates feature data, based on an image received from the camera 11.

For example, the processor 23 uses an image itself received from the camera 11 (hereafter a "whole image") as feature data. Alternatively, the processor 23 cuts out a sub-image including a region representing a road surface from a whole image received from the camera 11, and uses the cut-out sub-image as feature data. Information indicating a region supposed to represent a road surface in a whole image may be prestored in the memory 22. The processor 23 may refer to the information to identify the region to be cut out from a whole image.

Alternatively, the processor 23 may input a whole image or a sub-image into a classifier that has been trained to detect a detection target feature, thereby detecting a feature represented in the inputted whole image or sub-image (hereafter simply the "input image"). The processor 23 may then generate information indicating the type of the detected feature as feature data. As such a classifier, the processor 23 can use, for example, a "deep neural network (DNN)" that has been trained to detect a feature represented in an input image from the input image. As such a DNN, for example, a DNN having architecture of a convolutional neural network (CNN) type, e.g., Single Shot MultiBox Detector (SSD) or Faster R-CNN, is used. In this case, for each type of detection target feature (e.g., a lane-dividing line, a pedestrian crossing, and a stop line), the classifier calculates a confidence score indicating how likely the feature is represented in a region in the input image; the classifier calculates the confidence score for each of various regions in the input image. The classifier determines that a region where the confidence score for a certain type of feature is not less than a predetermined detection threshold represents the type of feature. The classifier then outputs information indicating a region including the detection target feature in the input image, e.g., a circumscribed rectangle of the detection target feature (hereafter an "object region") and information indicating the type of the feature represented in the object region. The processor 23 generates feature data so as to include the information indicating the type of the feature represented in the detected object region.

In addition, the processor 23 identifies the real-space position of the location or the feature represented in feature data, and includes information indicating this position in the feature data. For example, the processor 23 uses the position of the vehicle 2 at the time of generation of the image used for generating feature data as the position of the location represented in the feature data. Specifically, the processor 23 can use the position indicated by positioning information received from the GPS receiver 12 at the timing closest to the time of generation of the image used for generating the feature data as the position of the vehicle 2. Alternatively, in the case where an electronic control unit (ECU, not illustrated) of the vehicle 2 estimates the position of the vehicle 2, the processor 23 may obtain information indicating an estimated position of the vehicle 2 from the ECU via the communication interface 21. The processor 23 further obtains information indicating the travel direction of the vehicle 2 from the ECU. Additionally, the positions of pixels in an image correspond one-to-one to the directions from the camera 11 to objects represented in the respective pixels. Thus, when the feature data is a whole image or a sub-image, the processor 23 may estimate the real-space position corresponding to the center of the whole image or the sub-image as the position of the location represented in the feature data. In this case, the processor 23 estimates the position of the location corresponding to the center of the whole image or the sub-image, based on the direction with respect to the camera 11, the position and the travel direction of the vehicle 2, and the parameters of the camera 11, such as the direction of image capturing, the angle of view, and the height of the mounted position. Alternatively, when the feature data includes information indicating the type of feature detected from an image, the processor 23 estimates the position of the feature represented in an object region, based on the direction from the camera 11 to the position corresponding to the centroid of the object region, the position and the travel direction of the vehicle 2, and the parameters of the camera 11. Alternatively, the processor 23 may estimate the position of a feature represented in feature data by "structure from motion (SfM)." In this case, the processor 23 associates object regions representing the same feature in two images obtained at different timings with each other, using optical flow. The processor 23 can estimate the position of the feature by triangulation, based on the positions and the travel directions of the vehicle 2 at the times of acquisition of the two images, the parameters of the camera 11, and the positions of the object regions in the respective images.

The processor 23 includes, in feature data, the latitude and longitude indicating the position of the location or the feature represented in the feature data as information indicating the position of the location or the feature represented in the feature data. In addition, the processor 23 identifies a road section or a link including or lying closest to the position of the location or the feature represented in the feature data, by referring to the road map. The processor 23 may then include the identification number of the identified link in the feature data. When the feature data is a whole image or a sub-image, the processor 23 may further include the position and the travel direction of the vehicle 2 at the time of generation of the image and the parameters of the camera 11 in the feature data so that the server 3 can estimate the position of the feature represented in the whole image or the sub-image.

Whenever feature data is generated, the processor 23 outputs the generated feature data to the wireless communication terminal 13 via the communication interface 21. In this way, feature data is transmitted to the server 3.

The following describes the server 3, which is an example of the apparatus for determining sections for map update.

Figure 4:
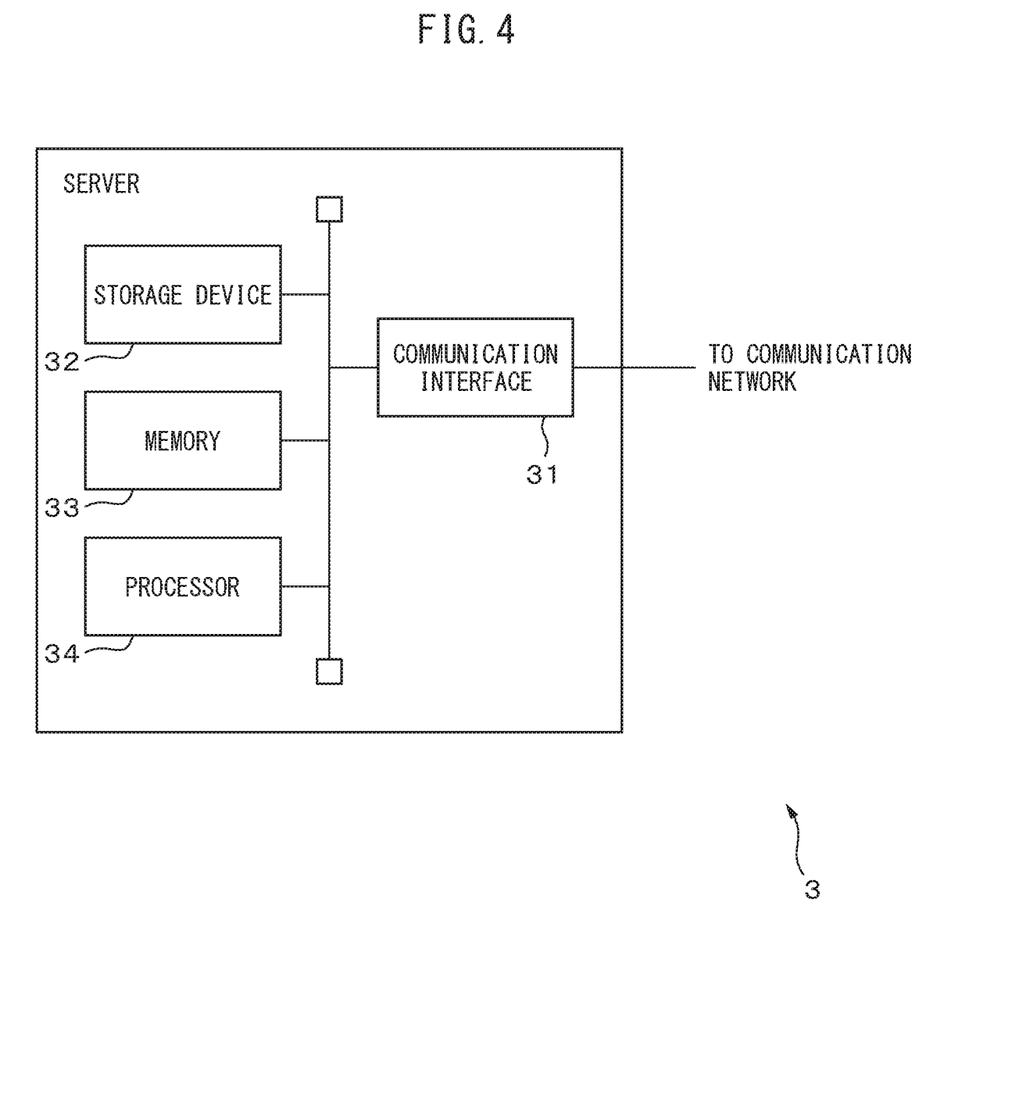
FIG. 4 illustrates the hardware configuration of a server, which is an example of the apparatus for determining sections for map update.

FIG. 4 illustrates the hardware configuration of the server 3, which is an example of the apparatus for determining sections for map update. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of a communication unit, includes an interface circuit for connecting the server 3 to the communication network 4. The communication interface 31 is configured to be communicable with the vehicle 2 via the communication network 4 and the wireless base station 5. More specifically, the communication interface 31 transmits a collection instruction received from the processor 34 to the vehicle 2 via the communication network 4 and the wireless base station 5. In addition, the communication interface 31 passes to the processor 34 feature data received from the vehicle 2 via the wireless base station 5 and the communication network 4.

The storage device 32, which is an example of the storage unit, includes, for example, a hard disk drive, or an optical medium and an access device therefor. The storage device 32 stores various types of data and information used in a section determination process for map update. For example, the storage device 32 stores information indicating a target region for generating or updating map information, a road map, information for identifying individual road sections, and information representing the connection relationship between individual road sections. For each road section, the storage device 32 further stores a map flag, an autonomous driving cost, a manual driving cost, a traffic volume, a map preparation cost, and a handover cost between the road section and an adjoining road section. In addition, the storage device 32 stores the upper limit of costs that is a target for generating or updating the map information (hereafter a "target upper-limit preparation cost") and a table representing the relationship between a traffic volume and a weighting factor, which depends on the traffic volume and is used for calculating scores. The storage device 32 further stores feature data received from the vehicle 2, and may also store a computer program for the processor 34 to execute the section determination process.

Individual road sections may be, for example, individual links or nodes represented in a road map used by a navigation device (not illustrated). More specifically, a section of a road from a location where multiple roads cross, diverge, or merge (hereafter a "crossing/merging point" for the sake of convenience), such as an intersection or an interchange, to an adjacent crossing/merging point is set as a single road section. Such a road section, if longer than a predetermined distance, may be divided into multiple road sections. A crossing/merging point is also set as a single road section.

The map flag indicates whether the map information is available for a vehicle to travel through the road section corresponding to the map flag by autonomous driving. More specifically, a map flag having a value indicating that the map information is available (e.g., 1) suggests that the map information includes information on features sufficient for autonomous driving of a vehicle in the road section corresponding to the map flag. In contrast, a map flag having a value indicating that the map information is unavailable (e.g., 0) suggests that the map information does not include information on features necessary for autonomous driving of a vehicle in the road section corresponding to the map flag. In the following, a road section where the map information is available for a vehicle to travel by autonomous driving will be referred to as a "prepared section." A road section where the map information is unavailable for a vehicle to travel by autonomous driving will be referred to as an "unprepared section."

The autonomous driving cost, the manual driving cost, and the handover cost are set for each road section so as to have larger values as a driver's load is heavier. The autonomous driving cost indicates a driver's load for the case where a vehicle travels through a corresponding road section by autonomous driving using the map information, and is set, for example, as the value of the product of a cost of travel by autonomous driving per unit time and an average time required to pass through the corresponding road section. Since a driver's load during travel by autonomous driving is not too heavy, the autonomous driving cost may be 0. The manual driving cost indicates a driver's load for the case where a vehicle travels through a corresponding road section by the driver's manual driving, and is set, for example, as the value of the product of a cost of travel by manual driving per unit time and an average time required to pass through the corresponding road section. Since a driver's load of travel by manual driving is generally heavier than that of travel by autonomous driving, the manual driving cost is higher than the autonomous driving cost regarding the same road section. The handover cost indicates a driver's load for the case where a handover between autonomous driving and manual driving occurs between two adjoining road sections. Thus, when no handover occurs between two successive road sections, the handover cost is 0. Regarding a road section including a crossing/merging point, the map flag, the autonomous driving cost, the manual driving cost, and the handover cost are set for each combination of those roads connected to the road section along which vehicles can travel. For example, regarding a road section including an intersection, the map flag, the autonomous driving cost, the manual driving cost, and the handover cost are set, for each road connected to the intersection, for each of the straight, right-turn, and left-turn directions with respect to the road. However, when traveling straight, turning right, or turning left is prohibited on a road connected to an intersection, the map flag, the autonomous driving cost, the manual driving cost, and the handover cost need not be set regarding the direction in which entry is prohibited. The handover cost may be set uniformly at the same value for all road sections.

The map preparation cost is a cost required to generate or update the map information regarding a corresponding road section. The map preparation cost of a road section that does not include a crossing/merging point is set at a larger value as the corresponding road section is longer or includes more lanes. The map preparation cost of a road section including a crossing/merging point is set, for each combination of those roads connected at the crossing/merging point along which vehicles can travel through the crossing/merging point, at a value proportional to the number of lanes of the combination.

The traffic volumes of individual road sections are obtained, for example, from a traffic information server via the communication network 4.

The memory 33, which is another example of the storage unit, includes, for example, nonvolatile and volatile semiconductor memories. The memory 33 temporarily stores various types of data generated during execution of the section determination process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes a map update process including the section determination process.

Figure 5:
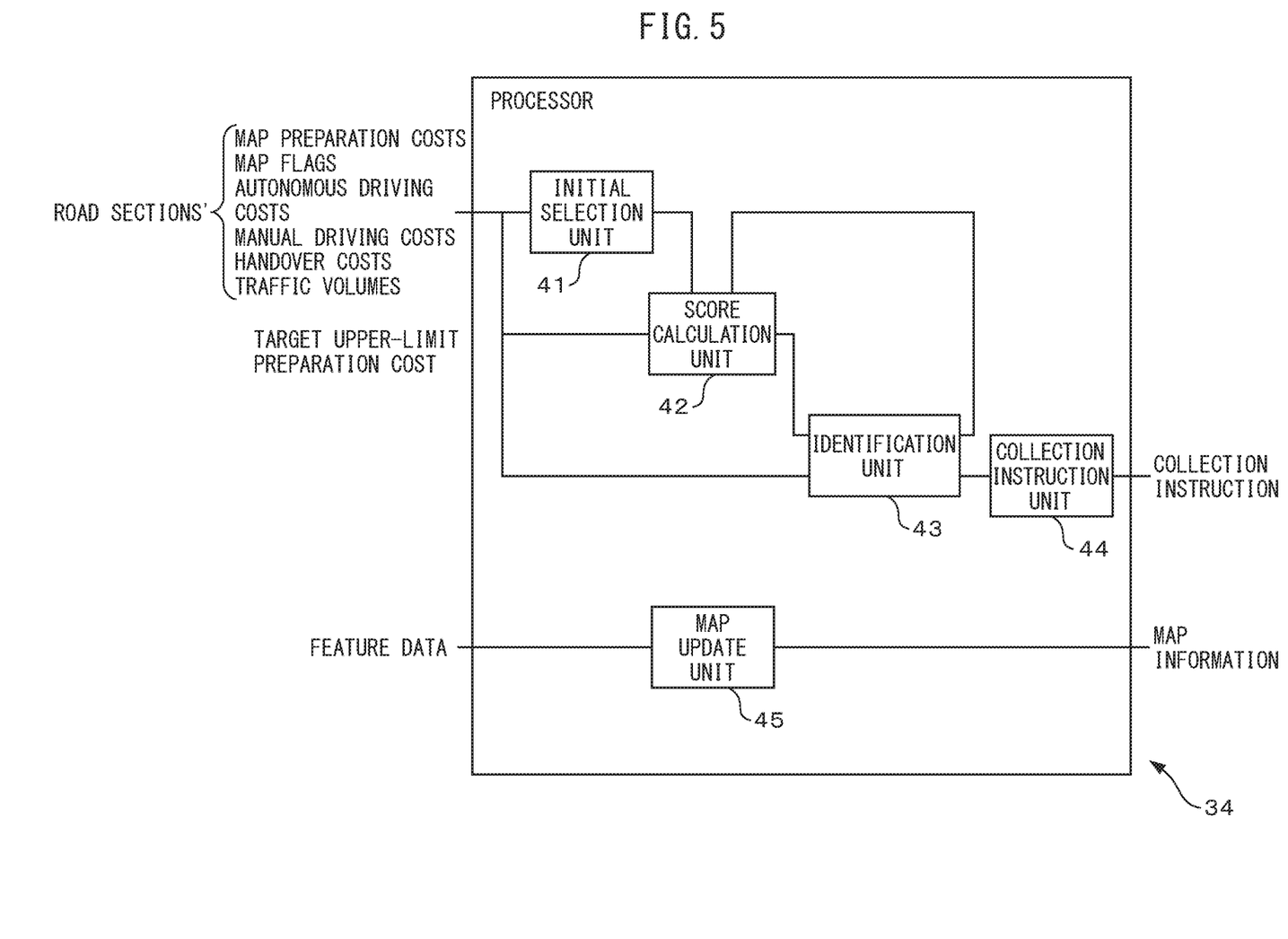
FIG. 5 is functional block diagram of a processor of the server, related to a map update process including a section determination process for map update.

FIG. 5 is a functional block diagram of the processor 34, related to the map update process including the section determination process. The processor 34 includes an initial selection unit 41, a score calculation unit 42, an identification unit 43, a collection instruction unit 44, and a map update unit 45. These units included in the processor 34 are functional modules, for example, implemented by a computer program executed by the processor 34, or may be dedicated operating circuits provided in the processor 34. Of these units included in the processor 34, the initial selection unit 41, the score calculation unit 42, and the identification unit 43 execute processing related to the section determination process.

The initial selection unit 41 selects two or more road sections that are targets for calculating a score, i.e., candidates for targets for collecting feature data, from a plurality of road sections included in a target region for generating or updating the map information. In the following, road sections that are candidates for targets for collecting feature data will be referred to simply as "candidate sections." For example, the initial selection unit 41 identifies unprepared sections by referring to the map flags of individual road sections. From the identified unprepared sections, the initial selection unit 41 selects two or more unprepared sections as candidate sections in descending order of the value obtained by multiplying the ratio of the traffic volume to the map preparation cost by the difference between the manual driving cost and the autonomous driving cost. The initial selection unit 41 stops selecting candidate sections when the total of the map preparation costs of the selected candidate sections reaches a target upper-limit preparation cost. When the total of the map preparation costs exceeds the target upper-limit preparation cost, the initial selection unit 41 excludes the last-selected unprepared section from the candidate sections to make the total of the map preparation costs less than the target upper-limit preparation cost.

The initial selection unit 41 may select candidate sections in accordance with any selection technique other than the above-described selection technique. For example, the initial selection unit 41 may select two or more unprepared sections as candidate sections at random. Alternatively, the initial selection unit 41 may select two or more unprepared sections as candidate sections in ascending order of the distance from a predetermined location in the target region for generating or updating the map information or in descending order of the standard satisfied by each road.

The initial selection unit 41 notifies the score calculation unit 42 of information indicating the selected individual candidate sections.

The score calculation unit 42 calculates a score of candidate sections when notified by the initial selection unit 41 of information indicating the selected individual candidate sections or whenever notified by the identification unit 43 of information indicating replaced candidate sections. The score indicates the degree of improvement of drivers' convenience provided by generating or updating the map information.

In the present embodiment, the following individual-section score Ei is calculated for each candidate section to calculate a score of all of the selected candidate sections.

$$Ei=(Ac+Hc)/Tv$$

Parameter Ac denotes the autonomous driving cost of a candidate section of interest. Parameter Hc denotes the sum of the handover costs between the candidate section of interest and unprepared sections among the road sections adjoining the candidate section of interest. When an unprepared section adjoining the candidate section of interest is also selected as a candidate sections, the handover cost is not incurred because the map information will be available also in the selected unprepared section after collection of feature data. The handover cost has to be allocated to only one of two adjoining road sections between which a handover occurs. Parameter Tv denotes a weighting factor of the candidate section of interest, which depends on the traffic volume. Parameter Tv is set at a larger value, for example, as the traffic volume of the candidate section of interest is greater. When the autonomous driving cost is set at 0, the individual-section score Ei is calculated on the basis of the handover cost and the traffic volume, as indicated by the above-described equation.

The score calculation unit 42 determines the total of the individual-section scores Ei calculated for individual candidate sections as the score of all of the selected candidate sections. As the selected candidate sections are connected longer with each other or with prepared sections in between, vehicles can travel by autonomous driving more continuously and the handover costs are lower; and thus the score is lower. In addition, as the traffic volumes of the selected candidate sections are greater, the score is lower. For this reason, as the score is lower, the degree of improvement of drivers' convenience provided by generating or updating the map information is higher.

Figure 6:
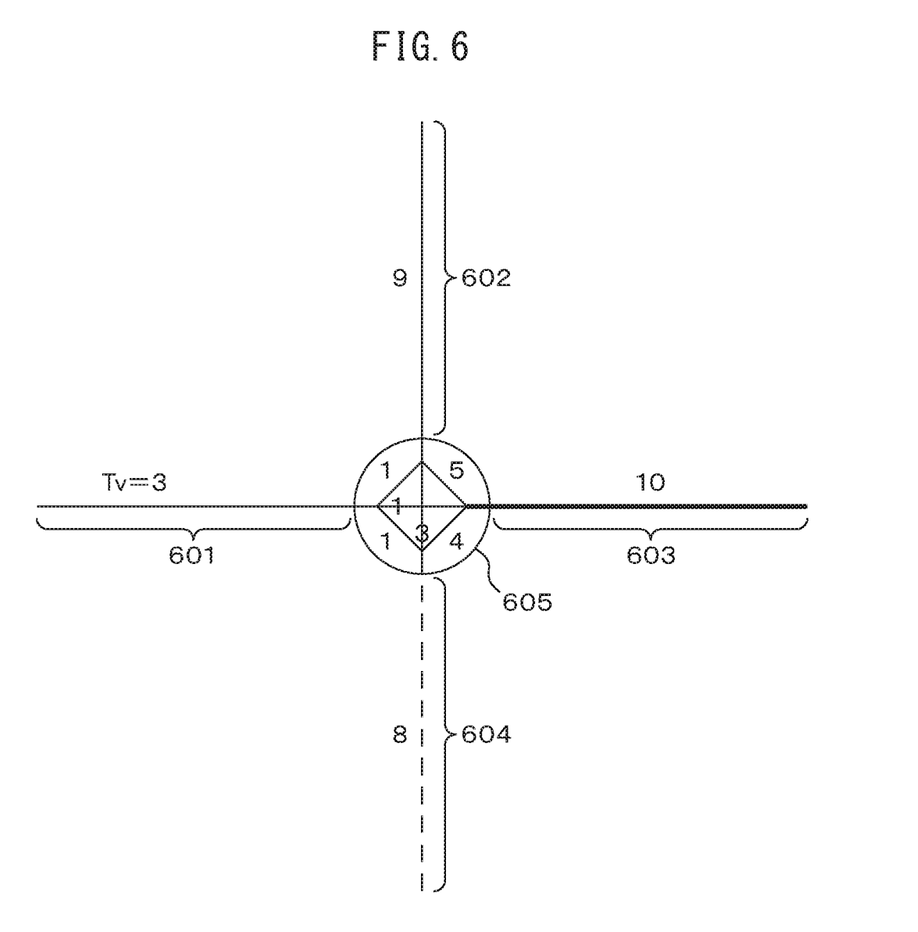
FIG. 6 is a schematic diagram for explaining calculation of a score.

FIG. 6 is a schematic diagram for explaining calculation of the score. In the example illustrated in FIG. 6, five road sections 601 to 605 are represented. Of these, each of the road sections 601 to 604 is set on a single road whereas the road section 605 includes an intersection connecting the road sections 601 to 604 crosswise. In FIG. 6, those individual routes connecting the road sections 601 to 604 which are travelable via the intersection are represented by lines. In this example, of the road sections 601 to 605, the road sections 601 and 602 as well as the road section 605 including the intersection are unprepared sections and candidate sections. The road section 603 is a prepared section, and the road section 604 is an unprepared section that is not a candidate section. In this case, a handover occurs during travel from one of the road sections 601 to 603 via the road section 605 to the road section 604. The road sections 601, 602, and 605 are unprepared sections at present, but will become prepared sections after preparation of map information. Thus, to calculate the score, it may be assumed that a handover does not occur during travel from the road section 601 via the road section 605 to the road section 602 and during the opposite travel (i.e., the handover cost is 0). Thus, assuming that the weighting factors Tv of the road sections are the values illustrated in FIG. 6 and that the autonomous driving costs and the handover costs of the road sections are 1 and 5, respectively, the score is as follows: $1/3+1/9+(1/1+1/1+(1+5)/1+1/5+(1+5)/3+(1+5)/4)=1093/90$.

The score calculation unit 42 notifies the identification unit 43 of the calculated score.

The identification unit 43 causes the score calculation unit 42 to calculate the score while replacing one or more of the two or more selected candidate sections with one or more unprepared sections that has not been selected as a candidate section. Whenever the score is calculated, the identification unit 43 stores the calculated score and information for identifying the corresponding candidate sections in the memory 33. When the score satisfies a predetermined end condition, the identification unit 43 identifies the minimum of the already calculated scores. As described above, as the score is lower, the degree of improvement of drivers' convenience provided by generating or updating the map information is higher. For this reason, when the calculated score is the smallest, the degree of improvement of drivers' convenience provided by generating or updating the map information is the highest. Thus the identification unit 43 identifies the candidate sections corresponding to the minimum of the calculated scores as target road sections for generating or updating the map information.

Whenever the score is calculated, the identification unit 43 replaces some of the candidate sections with other unprepared sections so that the score decreases. Whenever a candidate section is replaced, the identification unit 43 causes the score calculation unit 42 to calculate the score.

In the present embodiment, the identification unit 43 determines candidate sections to be replaced, by a technique following simulated annealing. More specifically, as the number of trials of replacement of candidate sections is smaller, the identification unit 43 replaces more candidate sections. Upon determining the number of candidate sections to be replaced, the identification unit 43 determines the candidate sections to be replaced in accordance with a predetermined standard of replacement. For example, the identification unit 43 sets an exclusion probability for each candidate section so that a candidate section having a larger value of (individual-section score×map preparation cost) is more likely to be excluded from the targets for calculating the score. Of the candidate sections, the identification unit 43 then determines a candidate section actually excluded from the targets for calculating the score, according to the set exclusion probabilities. For example, for each candidate section, the identification unit 43 assigns a random number generated in accordance with a predetermined technique of random number generation, and generates a probability, based on the assigned random number. Of the candidate sections, the identification unit 43 then excludes a candidate section such that the generated probability is not higher than the exclusion probability from the targets for calculating the score.

In addition, the identification unit 43 selects an unprepared section to be added to the targets for calculating the score as a candidate section from unprepared sections that are not candidate sections. To this end, the identification unit 43 sets an addition probability for each unprepared section so that an unprepared section having a smaller value of (individual-section score×map preparation cost) is more likely to be added to the targets for calculating the score as a candidate section. Of the unprepared sections, the identification unit 43 then determines an unprepared section to be added to the targets for calculating the score as a candidate section, according to the set addition probabilities. To this end, the identification unit 43 determines an unprepared section to be added to the targets for calculating the score by a procedure similar to that for determining a candidate section to be excluded from the targets for calculating the score.

The identification unit 43 may set the exclusion probability for each candidate section so that a candidate section having a higher individual-section score has a higher exclusion probability. Alternatively, the identification unit 43 may set the exclusion probability for each candidate section so that a candidate section having a smaller difference between the manual driving cost and the autonomous driving cost has a higher exclusion probability.

The identification unit 43 may set the addition probability for each unprepared section that is not a candidate section so that an unprepared section having a greater difference between the manual driving cost and the autonomous driving cost has a higher addition probability. Alternatively, the identification unit 43 may set the addition probability for each unprepared section that is not a candidate section so that the addition probability of an unprepared section adjoining one of the candidate sections that have been selected as the targets for calculating the score is higher than that of another unprepared section.

The identification unit 43 selects an unprepared section to be added to the targets for calculating the score so that the total of the map preparation costs of the candidate sections after the replacement does not exceed the target upper-limit preparation cost. The identification unit 43 preferably determines an unprepared section to be added as a candidate section so that the total of the map preparation costs of the candidate sections after the replacement approaches the target upper-limit preparation cost as much as possible. This enables the identification unit 43 to determine more unprepared sections as target road sections for generating or updating the map information. The total number of candidate sections that are targets for calculating the score may be changed before and after the replacement.

Whenever the score is calculated, the identification unit 43 determines whether a predetermined end condition is satisfied. The predetermined end condition may be, for example, that the differences between the absolute values of the latest calculated scores are not greater than a predetermined value. Alternatively, the predetermined end condition may be that the score is not greater than an end criterion value, or that the number of trials of calculation of the score is not less than a predetermined end determination number. When one of these end conditions is satisfied, the identification unit 43 finishes replacement of candidate sections and calculation of the score by the score calculation unit 42.

Alternatively, the identification unit 43 may finish replacement of candidate sections and calculation of the score by the score calculation unit 42 when two or more of these end conditions are satisfied. The identification unit 43 then identifies the candidate sections corresponding to the minimum of the already calculated scores as target road sections for generating or updating the map information.

The identification unit 43 notifies the collection instruction unit 44 of information for identifying the road sections identified as target road sections for generating or updating the map.

The collection instruction unit 44 generates an instruction to collect feature data regarding the target road sections for generating or updating the map information notified by the identification unit 43. More specifically, the collection instruction unit 44 generates the collection instruction so as to include information for identifying the target road sections for generating or updating the map information. The collection instruction unit 44 then transmits the generated collection instruction to the vehicle 2 via the communication interface 31.

The map update unit 45 adds information on features represented in collected feature data to the map information read from the storage device 32 for each target road section for generating or updating the map information, thereby generating or updating the map information. For example, when the feature data is a whole image or a sub-image, the map update unit 45 detects a feature and its type from the whole image or the sub-image and estimates the position of the detected feature by executing the same process as is executed by the data acquisition device 14 mounted on the vehicle 2. The map update unit 45 then identifies the average of those positions of features of the same type in a predetermined area which are included in the collected feature data or estimated as described above as the position of the features. For each feature whose position is identified, the map update unit 45 includes information indicating the type and the identified position of the feature in the map information to update the map information.

Figure 7:
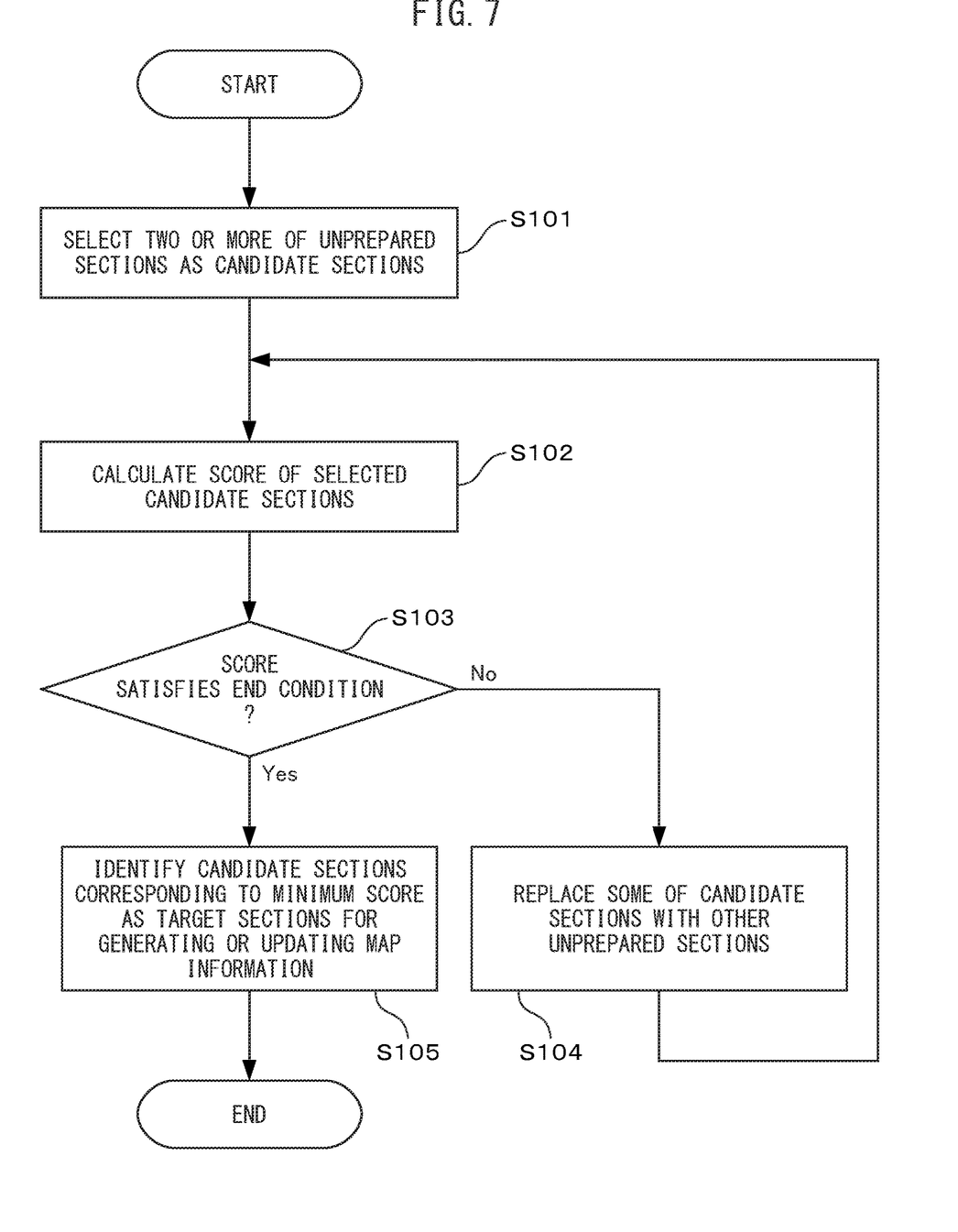
FIG. 7 is an operation flowchart of the section determination process.

FIG. 7 is an operation flowchart of the section determination process by the server 3. The processor 34 of the server 3 executes the section determination process in accordance with the operation flowchart described below.

The initial selection unit 41 of the processor 34 selects two or more unprepared sections that are targets for calculating a score, i.e., candidates for targets for collecting feature data, as candidate sections from unprepared sections included in a target region for generating or updating map information (step S101). Regarding the selected candidate sections, the score calculation unit 42 of the processor 34 calculates a score indicating the degree of improvement of drivers' convenience provided by generating or updating the map information (step S102).

The identification unit 43 of the processor 34 determines whether the calculated score satisfies a predetermined end condition (step S103). When the end condition is not satisfied (No in step S103), the identification unit 43 replaces some of the candidate sections with other unprepared sections (step S104). Specifically, the identification unit 43 replaces more candidate sections as the number of trials of calculation of the score is smaller, as described above. The processor 34 then repeats the processing of step S102 and the subsequent steps.

When the end condition is satisfied (Yes in step S103), the identification unit 43 identifies the candidate sections corresponding to the minimum of the already calculated scores as target road sections for generating or updating the map information (step S105). The processor 34 then terminates the section determination process. After termination of the section determination process, the collection instruction unit 44 of the processor 34 generates an instruction to collect feature data regarding the target road sections for generating or updating the map information, and transmits the generated collection instruction to the vehicle 2 via the communication interface 31. When the amount of collected feature data of the target road sections for generating or updating the map information reaches or exceeds a predetermined amount, the map update unit 45 of the processor 34 adds information on features represented in the collected feature data to the map information for each target road section for generating or updating the map information.

As has been described above, the apparatus for determining sections for map update calculates a score while successively replacing candidate sections, which are targets for generating or updating map information, selected from unprepared sections included in a target region for generating or updating the map information. When a calculated score satisfies a predetermined end condition, the apparatus identifies the candidate sections corresponding to a score for the case where the degree of improvement of drivers' convenience is the highest among the already calculated scores as target road sections for generating or updating the map information. Thus the apparatus can determine target road sections for generating or updating the map information so that drivers are likely to have the advantage of autonomous driving control. In particular, the apparatus calculates the score, taking account of the handover costs of the respective candidate sections. For this reason, the apparatus can select road sections connected as long as possible as targets for generating or updating the map information so that the handover costs are reduced as much as possible. As a result, the target road sections for generating or updating the map information are selected so as to extend the total length of road sections where autonomous driving is continuously applicable. Thus the apparatus can determine target road sections for generating or updating the map information so that drivers can have the greatest advantage of autonomous driving control. In addition, hardware resources used for determining target road sections for generating or updating the map information can be reduced because the apparatus can determine the road sections without calculating the score for all combinations of road sections.

According to a modified example, the score calculation unit 42 may calculate the individual-section score Ei of each selected candidate section in accordance with the following equation.

$$Ei=(Ac-Mc+Hc)/Tv$$

As described above, parameter Ac denotes the autonomous driving cost of a candidate section of interest. Parameter Mc denotes the manual driving cost of the candidate section of interest. Parameter Hc denotes the sum of the handover costs between the candidate section of interest and unprepared sections among the road sections adjoining the candidate section of interest. Parameter Tv denotes a weighting factor of the candidate section of interest, which depends on the traffic volume.

The individual-section score defined in this way decreases as the difference obtained by subtracting the manual driving cost from the autonomous driving cost increases. Thus, a road section where a driver's load is more greatly reduced by preparing the map information is more likely to be selected as a target section for generating or updating the map information. Thus, according to this modified example, the apparatus can determine target road sections for generating or updating the map information so that drivers are more likely to have the advantage of autonomous driving control.

Alternatively, the score calculation unit 42 may calculate the individual-section score Ei of each selected candidate section in accordance with the following equation.

$$Ei=(Mc-Ac-Hc)*Tv$$

When the autonomous driving cost is set at 0, the individual-section score Ei according to this modified example is calculated on the basis of the manual driving cost, the handover cost, and the traffic volume, as indicated by the above described equation.

In this case, as the score is higher, the degree of improvement of drivers' convenience provided by generating or updating the map information is higher. Thus the identification unit 43 may use the condition that the score is not less than an end criterion value, as one of the predetermined end conditions. When an end condition is satisfied, the identification unit 43 identifies the candidate sections corresponding to the maximum of the already calculated scores as target road sections for generating or updating the map information. In this modified example, the identification unit 43 preferably replaces road sections that are targets for calculating the score so as to increase the score. Thus the identification unit 43 sets an exclusion probability for each candidate section so that a candidate section having a smaller value of (individual-section score/map preparation cost) is more likely to be excluded from the targets for calculating the score. Conversely, the identification unit 43 sets an addition probability for each unprepared section so that an unprepared section having a larger value of (individual-section score/map preparation cost) is more likely to be added to the targets for calculating the score as a candidate section.

In this modified example also, the apparatus can determine target road sections for generating or updating the map information so that drivers are more likely to have the advantage of autonomous driving control.

The computer program for causing a computer to execute processing of the units executed by the processor 34 of the server 3 according to the embodiment or modified examples may be distributed in a form recorded on a semiconductor memory device, a magnetic medium, or an optical medium.

As described above, those skilled in the art may make various modifications according to embodiments within the scope of the present invention.

What is claimed is:

1. An apparatus for determining sections for map update, comprising:
   a memory configured to store, for each of a plurality of road sections included in a predetermined region, a map preparation cost required to generate or update map information for a vehicle to travel by autonomous driving regarding the road section, a map flag indicating whether the map information is available, and a handover cost indicating a driver's load for the case where a handover between autonomous driving and manual driving occurs between the road section and an adjacent road section, of the plurality of road sections, adjoining the road section; and
   a processor configured to:
   select two or more road sections from road sections where the map information is unavailable among the plurality of road sections so that the total of the map preparation costs of the selected road sections is not greater than a target upper-limit preparation cost, by referring to the map flags of the plurality of road sections, calculate a score indicating the degree of improvement of drivers' convenience provided by generating or updating the map information regarding the two or more selected road sections, based on the handover costs of the two or more selected road sections, and calculate the score while replacing one or more of the two or more selected road sections with one or more unselected road sections of the road sections where the map information is unavailable, determine whether the score satisfies a predetermined end condition, identify, when the predetermined end condition is satisfied, the two or more selected road sections corresponding to a score for the case where the degree of improvement of drivers' convenience is the highest among the calculated scores as target road sections for generating or updating the map information, and autonomously drive the vehicle based on the generated or updated map information.

2. The apparatus according to claim 1, wherein for each of the plurality of road sections, the memory further stores a traffic volume of the road section and an autonomous driving cost indicating a driver's load for the case where a vehicle travels through the road section by autonomous driving using the map information, and the processor weights, for each of the two or more selected road sections, the sum of the autonomous driving cost and the handover cost of the road section with a weighting factor depending on the traffic volume of the road section, and calculates the total of the weighted sums as the score.

3. The apparatus according to claim 1, wherein for each of the plurality of road sections, the memory further stores a traffic volume of the road section, an autonomous driving cost indicating a driver's load for the case where a vehicle travels through the road section by autonomous driving using the map information, and a manual driving cost indicating a driver's load for the case where a vehicle travels through the road section by the driver's manual driving, and the processor weights, for each of the two or more selected road sections, the value of the autonomous driving cost minus the manual driving cost plus the handover cost with a weighting factor depending on the traffic volume of the road section, and calculates the total of the weighted values as the score.

4. The apparatus according to claim 1, wherein the processor replaces a road section of the two or more selected road sections with the unselected road section so that, of the two or more selected road sections, a road section having a greater product of the map preparation cost and an individual-section score calculated for the road section is more likely to be replaced with the unselected road section, the individual-section score being a part of the score.

5. The apparatus according to claim 1, wherein for each of the plurality of road sections, the memory further stores a traffic volume of the road section, and the processor selects two or more road sections from road sections where the map information is unavailable among the plurality of road sections in descending order of the ratio of the traffic volume to the map preparation cost.

6. A method for determining sections for map update, comprising:

selecting, among a plurality of road sections included in a predetermined region, two or more road sections from road sections where map information for a vehicle to travel by autonomous driving is unavailable so that the total of map preparation costs required to generate or update the map information regarding the selected road sections is not greater than a target upper-limit preparation cost, by referring to map flags respectively indicating whether the map information is available regarding the plurality of road sections;

calculating a score indicating the degree of improvement of drivers' convenience provided by generating or updating the map information regarding the two or more selected road sections, based on handover costs of the two or more selected road sections, the handover costs each indicating a driver's load for the case where a handover between autonomous driving and manual driving occurs between the corresponding road section and an adjacent road section, of the plurality of road sections, adjoining the road section;

calculating the score while replacing one or more of the two or more selected road sections with one or more unselected road sections of the road sections where the map information is unavailable;

determining whether the score satisfies a predetermined end condition;

identifying, when the predetermined end condition is satisfied, the two or more selected road sections corresponding to a score for the case where the degree of improvement of drivers' convenience is the highest among the calculated scores as target road sections for generating or updating the map information; and autonomously driving the vehicle based on the generated or updated map information.

7. The method according to claim 6, wherein for each of the plurality of road sections, storing in a memory a traffic volume of the road section and an autonomous driving cost indicating a driver's load for the case where a vehicle travels through the road section by autonomous driving using the map information, and weighing, for each of the two or more selected road sections, the sum of the autonomous driving cost and the handover cost of the road section with a weighting factor depending on the traffic volume of the road section, and calculating the total of the weighted sums as the score.

8. The method according to claim 6, wherein for each of the plurality of road sections, storing in a memory a traffic volume of the road section, an autonomous driving cost indicating a driver's load for the case where a vehicle travels through the road section by autonomous driving using the map information, and a manual driving cost indicating a driver's load for the case where a vehicle travels through the road section by the driver's manual driving, and weighing, for each of the two or more selected road sections, the value of the autonomous driving cost minus the manual driving cost plus the handover cost with a weighting factor depending on the traffic volume of the road section, and calculating the total of the weighted values as the score.

9. The method according to claim 6, further comprising replacing a road section of the two or more selected road sections with the unselected road section so that, of the two or more selected road sections, a road section having a greater product of the map preparation cost and an individual-section score calculated for the road section is more likely to be replaced with the unselected road section, the individual-section score being a part of the score.

10. The method according to claim 6, wherein for each of the plurality of road sections, storing in a memory a traffic volume of the road section, and selecting two or more road sections from road sections where the map information is unavailable among the plurality of road sections in descending order of the ratio of the traffic volume to the map preparation cost.

11. A non-transitory recording medium that stores a computer program for determining sections for map update, the computer program causing a computer to execute a process comprising:

selecting, among a plurality of road sections included in a predetermined region, two or more road sections from road sections where map information for a vehicle to travel by autonomous driving is unavailable so that the total of map preparation costs required to generate or update the map information regarding the selected road sections is not greater than a target upper-limit preparation cost, by referring to map flags respectively indicating whether the map information is available regarding the plurality of road sections;

calculating a score indicating the degree of improvement of drivers' convenience provided by generating or updating the map information regarding the two or more selected road sections, based on handover costs of the two or more selected road sections, the handover costs each indicating a driver's load for the case where a handover between autonomous driving and manual driving occurs between the corresponding road section and an adjacent road section, of the plurality of road sections, adjoining the road section;

calculating the score while replacing one or more of the two or more selected road sections with one or more unselected road sections of the road sections where the map information is unavailable;

determining whether the score satisfies a predetermined end condition;

identifying, when the predetermined end condition is satisfied, the two or more selected road sections corresponding to a score for the case where the degree of improvement of drivers' convenience is the highest among the calculated scores as target road sections for generating or updating the map information; and autonomously driving the vehicle based on the generated or updated map information.

\* \* \* \* \*